(12) United States Patent
Kambara et al.

(10) Patent No.: US 11,472,701 B2
(45) Date of Patent: Oct. 18, 2022

(54) HYDROGEN PURIFICATION DEVICE AND HYDROGEN PURIFICATION METHOD

(71) Applicants: National University Corporation Tokai National Higher Education and Research System, Aichi (JP); SAWAFUJI ELECTRIC CO., LTD., Gunma (JP)

(72) Inventors: Shinji Kambara, Aichi (JP); Tomonori Miura, Gunma (JP); Yukio Hayakawa, Aichi (JP)

(73) Assignees: National University Corporation Tokai National Higher Education and Research System, Aichi (JP); SAWAFUJI ELECTRIC CO., LTD., Gunma (JP)

( * ) Notice: Subject to any disclaimer, the term of this patent is extended or adjusted under 35 U.S.C. 154(b) by 154 days.

(21) Appl. No.: 16/971,251

(22) PCT Filed: Jan. 9, 2019

(86) PCT No.: PCT/JP2019/000265
§ 371 (c)(1),
(2) Date: Aug. 19, 2020

(87) PCT Pub. No.: WO2019/187475
PCT Pub. Date: Oct. 3, 2019

(65) Prior Publication Data
US 2020/0385267 A1 Dec. 10, 2020

(30) Foreign Application Priority Data
Mar. 29, 2018 (JP) .............................. JP2018-063816

(51) Int. Cl.
$C01B\ 3/56$ (2006.01)
$C01B\ 3/04$ (2006.01)
$C01B\ 3/50$ (2006.01)

(52) U.S. Cl.
CPC .................. $C01B\ 3/56$ (2013.01); $C01B\ 3/04$ (2013.01); $C01B\ 3/503$ (2013.01);
(Continued)

(58) Field of Classification Search
CPC .. C01B 3/56; C01B 3/04; C01B 3/503; C01B 2203/0272; C01B 2203/0405;
(Continued)

(56) References Cited

U.S. PATENT DOCUMENTS

| 10,577,241 | B2 | 3/2020 | Kambara | |
|---|---|---|---|---|
| 2007/0056841 | A1 | 3/2007 | Agarwal | |
| 2015/0238922 | A1* | 8/2015 | Kambara | ............ H01M 8/0687 422/186.04 |

FOREIGN PATENT DOCUMENTS

| JP | H05184852 | 7/1993 |
|---|---|---|
| JP | H11285613 | 10/1999 |

(Continued)

*Primary Examiner* — Steven J Bos
*Assistant Examiner* — Syed T Iqbal
(74) *Attorney, Agent, or Firm* — Wells St. John P.S.

(57) ABSTRACT

Provided are a hydrogen purification device and a hydrogen purification method whereby hydrogen having a high purity can be purified at a high yield from a starting gas. The hydrogen purification device comprises: a starting gas source that supplies a starting gas, said starting gas containing hydrogen molecules and/or a hydride, to a discharge space; a plasma reactor that defines at least a part of the discharge space; a hydrogen flow channel that is connected to the discharge space; and leads out purified hydrogen from the starting gas source; a hydrogen separation membrane that partitions the discharge space from the hydrogen flow channel defines at least a part of the discharge space by one (Continued)

surface thereof and defines at least a part of the hydrogen flow channel by the other surface thereof; an electrode that is positioned outside the discharge space; and an adsorbent that is filled in the discharge space and adsorbs the starting gas. In the hydrogen purification method according to the present invention, the starting gas is adsorbed by the adsorbent in the discharge space. Hydrogen molecules, which have been desorbed from the adsorbent by discharge, are allowed to penetrate through the hydrogen separation membrane 4 and led out into the hydrogen flow channel.

9 Claims, 5 Drawing Sheets

(52) U.S. Cl.
CPC ....... *C01B 2203/0272* (2013.01); *C01B 2203/042* (2013.01); *C01B 2203/0405* (2013.01); *C01B 2210/0018* (2013.01); *C01B 2210/0065* (2013.01)

(58) Field of Classification Search
CPC ...... C01B 2203/042; C01B 2210/0018; C01B 2210/0065; C01B 2203/147; C01B 2203/169; C01B 3/50; C01B 3/508; C01B 3/501; Y02E 60/36; B01D 53/04; B01D 53/22

See application file for complete search history.

(56) References Cited

FOREIGN PATENT DOCUMENTS

| | | | | |
|---|---|---|---|---|
| JP | H11-319486 | | 11/1999 | |
| JP | 2003-154235 | | 5/2003 | |
| JP | 2004-359508 | A | 12/2004 | |
| JP | 2005-313108 | | 11/2005 | |
| JP | 2005313108 | A * | 11/2005 | ............ B01D 53/32 |
| JP | 2006-312133 | | 11/2006 | |
| JP | 2014-070012 | | 4/2014 | |
| JP | 2015-186769 | | 10/2015 | |
| JP | 2017-206422 | | 11/2017 | |
| JP | 6241803 | | 12/2017 | |
| JP | 6241804 | | 12/2017 | |
| WO | WO PCT/JP2019/000265 | | 2/2019 | |

* cited by examiner

HYDROGEN PURIFICATION DEVICE AND HYDROGEN PURIFICATION METHOD

CROSS REFERENCE TO RELATED APPLICATION

This is a 35 U.S.C. §371 application of, and claims priority to, International Application No. PCT/JP2019/000265, filed on Jan. 9, 2019, which was published as WO 2019/187475 on Oct. 3, 2019, and which claims priority to JP Patent Application No. 2018-063816, which was filed on Mar. 29, 2018, the teachings of which are incorporated herein by reference.

TECHNICAL FIELD

The present invention relates to hydrogen purification devices and, in particular, to a hydrogen purification device and hydrogen purification method for purifying high-purity hydrogen from a starting gas at a high yield.

BACKGROUND ART

There is a need for technology for purifying high-purity hydrogen from a starting gas and supplying it in a stable manner. The inventors have invented a method and device for generating hydrogen by transforming ammonia into plasma by an electric discharge, disclosed as Patent Document 1. Patent Document 1 discloses a hydrogen generating device including a plasma reactor, a high-voltage electrode, and a ground electrode. In the hydrogen generating device of Patent Document 1, the hydrogen separation membrane functions as the high-voltage electrode, and the device generates high-purity hydrogen by causing a dielectric barrier discharge between the hydrogen separation membrane and the ground electrode to transform the ammonia contained in the supplied gas into plasma under conditions of room temperature and atmospheric pressure. By using the hydrogen separation membrane for the discharge, separation of high-purity hydrogen from the gas mixture can be carried out at room temperature and at atmospheric pressure.

In the hydrogen generating device using plasma discharge disclosed in Patent Document 1, it was necessary to increase the power for uniformly transforming the raw material in the cylindrical reactor into plasma according to the capacity of the plasma reactor. With a large plasma reactor, the energy efficient could actually be worse than a small plasma reactor, and there was thus a risk of reduced hydrogen yield when large-scale production of hydrogen was necessary. In the hydrogen generating device disclosed in Patent Document 1, when continuously producing large amounts of hydrogen, the starting gas that was not turned into hydrogen would be emitted as exhaust gas, and it was thus necessary to perform exhaust gas treatment as the hydrogen production amount increased. If it is possible to make the starting gas remain in the plasma reactor for a longer time, it may be possible to transform the starting gas into plasma more efficiently.

Patent Document 2 discloses a toxic gas decomposing device having an adsorbing structure for adsorbing toxic gas and odorous components disposed in a discharge space, which adsorbs and captures or reduces the movement speed of the toxic gas and odorous components and decomposes them by plasma. However, adsorbing structures capable of controlling the movement speed of gases that can be raw material for hydrogen production are hitherto unknown.

RELATED ART DOCUMENTS

Patent Documents

Patent Document 1: SP2014-70012
Patent Document 2: WH11-319486

DISCLOSURE OF THE INVENTION

Problems to be Solved by the Invention

The present invention was made in view of the circumstances stated above, and an object thereof is to provide a hydrogen purification device and hydrogen purification method capable of purifying hydrogen from a starting gas at a high yield and provide high-purity hydrogen.

Means for Solving the Problems

The hydrogen purification device according to the present invention includes a starting gas source that supplies a starting gas containing hydrogen molecules and/or hydrides to a discharge space, a plasma reactor that defines at least a part of the discharge space, a hydrogen flow channel that is connected to the discharge space and leads out purified hydrogen from the starting gas source, a hydrogen separation membrane that allows only hydrogen to pass therethrough, partitions the discharge space from the hydrogen flow channel, defines at least a part of the discharge space by one surface thereof, and defines at least a part of the hydrogen flow channel by the other surface thereof, an electrode that is disposed outside the discharge space, and an adsorbent that is filled in the discharge space and adsorbs the starting gas.

In the hydrogen purification device according to the present invention, it is preferable that the adsorbent is zeolite and/or activated alumina.

In the hydrogen purification device according to the present invention, it is preferable that the starting gas source is a vessel that supplies a gas containing hydrogen molecules, and that the adsorbent is a hydrogen adsorbent that adsorbs hydrogen molecules. Alternatively, in the hydrogen purification device according to the present invention, it is preferable that the starting gas source is a vessel that supplies a gas containing ammonia, and that the adsorbent is an ammonia adsorbent that adsorbs ammonia.

It is preferable that the hydrogen purification device according to the present invention further includes a pressurizing means for pressurizing the discharge space.

The present invention also provides a hydrogen purification method. The hydrogen purification method according to the present invention is a method for purifying hydrogen using a hydrogen purification device including a discharge space defined by a plasma reactor and a hydrogen separation membrane, an adsorbent contained in the discharge space, and a hydrogen flow channel partitioned from the plasma reactor by the hydrogen separation membrane. The hydrogen purification method according to the present invention is characterized in that it includes the following steps: supplying a starting gas containing hydrogen molecules and/or hydrides to the discharge space, adsorbing the hydrogen molecules and/or hydrides by the adsorbent, causing an electric discharge in the discharge space to desorb material adsorbed by the adsorbent in the form of atoms, reducing pressure in the hydrogen flow channel to cause the hydrogen atoms in the discharge space to permeate the hydrogen separation membrane, and introducing the hydrogen atoms that have permeated the hydrogen separation membrane into the hydrogen flow channel as hydrogen molecules.

The hydrogen purification method according to the present invention preferably includes the steps of measuring the concentration of the starting gas at the exit of the discharge space, comparing the measured value of the concentration of the starting gas with a reference value, and, when the measured value of the concentration of the starting gas is higher than the reference value, performing one or more control operations selected from reducing the supply rate of the starting gas, further reducing pressure in the hydrogen flow channel, and raising the voltage applied to the discharge space.

It is preferable that the hydrogen purification method according to the present invention further includes a step of pressurizing the discharge space.

Effects of the Invention

In the hydrogen purification device according to the present invention, the adsorbent filling the discharge space adsorbs the supplied starting gas. Since the starting gas remains in the discharge space in a state of being adsorbed by the adsorbent until it has decomposed into hydrogen atoms and other atoms due to the electric discharge, it is possible to decompose almost all the starting gas into hydrogen atoms and other atoms. Of the decomposition products produced in the discharge space, the hydrogen separation membrane only lets the hydrogen atoms pass therethrough, so hydrogen gas with a high purity corresponding to the supply rate of starting gas is introduced into the hydrogen flow channel at a high yield. As a result, the hydrogen purification device according to the present invention can purify hydrogen gas with a high purity corresponding to the supply rate of starting gas at a high yield.

Since the hydrogen purification device according to the present invention decomposes nearly all the supplied starting gas in the discharge space, it is possible to greatly reduce the amount of gas emitted from the device as starting gas. Therefore, the recovery treatment means for the starting gas contained in the exhaust gas can be simplified, or exhaust gas treatment means are not needed at all.

By changing the type of adsorbent to fill the discharge space, it is possible for the hydrogen purification device according to the present invention to handle various starting gases.

MODE FOR CARRYING OUT THE INVENTION

Figure 1:
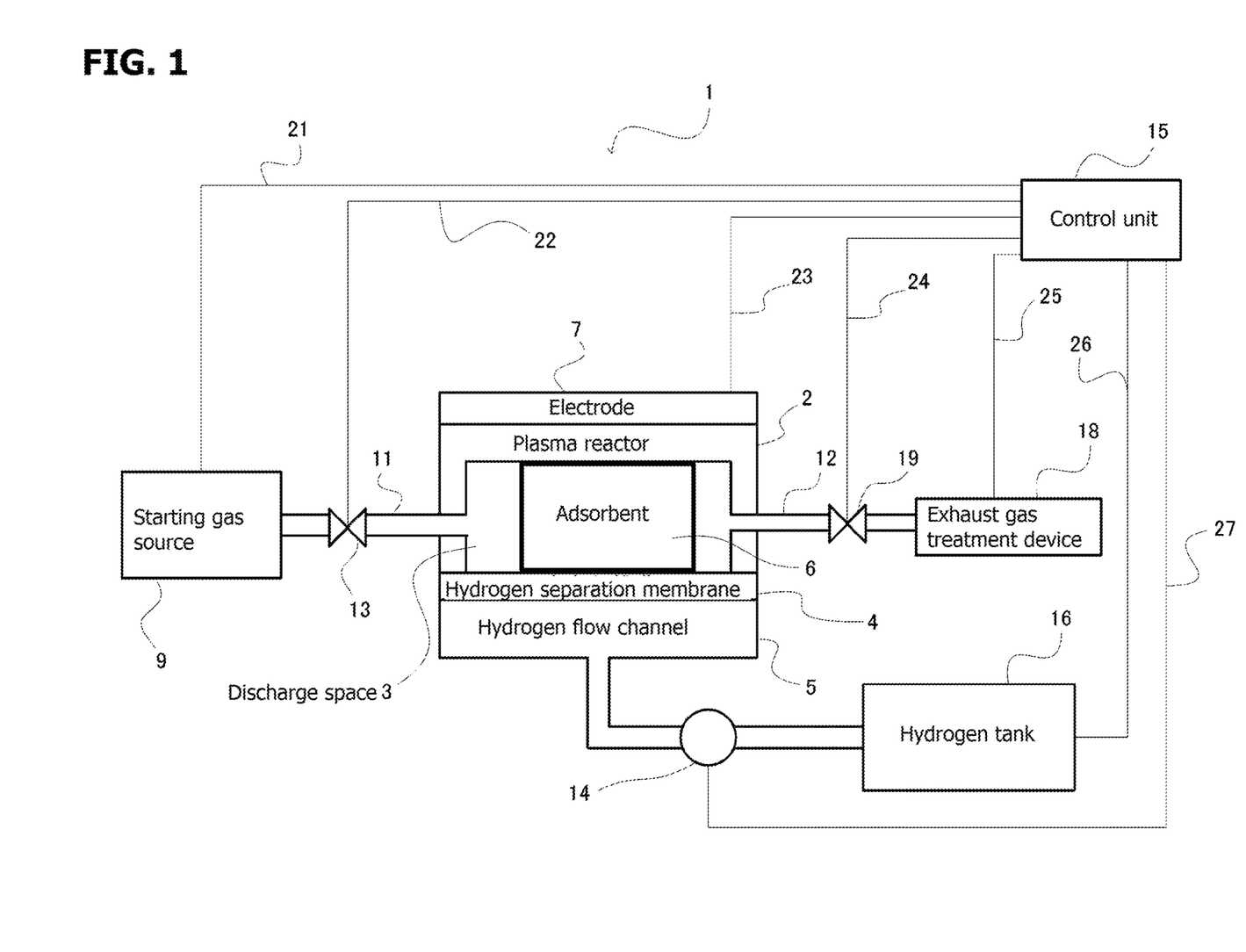
FIG. 1 is a block diagram showing a hydrogen purification device 1 according to an embodiment of the present invention.
Figure 2:
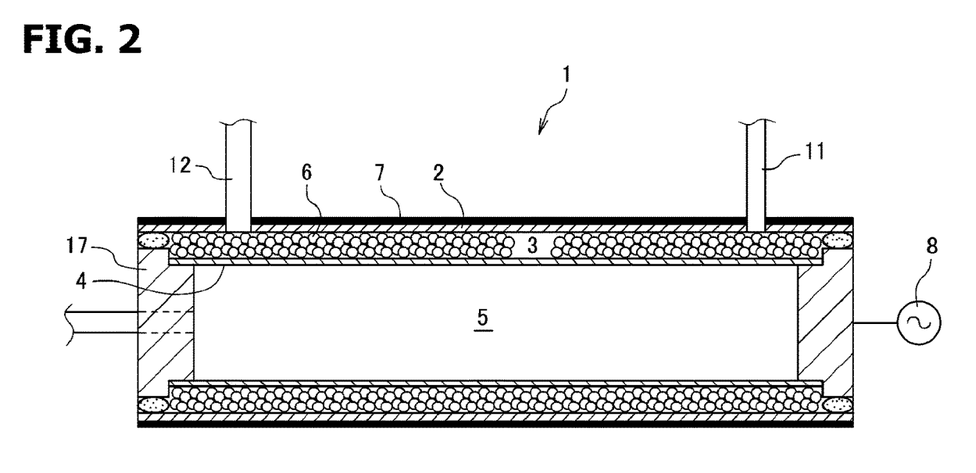
FIG. 2 is a vertical cross-sectional view of a plasma reactor according to Example 1 of the present invention.

FIG. 1 is a block diagram that schematically shows the main configuration of the hydrogen purification device 1 according to the present invention. FIG. 2 is a vertical cross-sectional view of a preferred embodiment of the plasma reactor 2. A preferred embodiment of the hydrogen purification device 1 according to the present invention is described below with reference to FIG. 1 and FIG. 2.

The hydrogen purification device 1 according to the present invention includes a starting gas source 9, a plasma reactor 2, a hydrogen separation membrane 4, a hydrogen flow channel 5, a hydrogen tank 16, and a control unit 15.

The plasma reactor 2 transforms matter contained therein into plasma by an electric discharge generated in the reactor interior. The plasma reactor 2 can be made of glass such as quartz glass, ceramics such as alumina, or a highly insulating resin such as barium titanate, polycarbonate, or acrylic. The most preferable material for the plasma reactor 2 is glass. It is preferable that the plasma reactor 2 forms a discharge space 3 therein, or forms part of a partition wall that defines the discharge space 3 together with another member. The hydrogen separation membrane 4 or another electrode may be used as the other member that defines the discharge space 3.

As a hydrogen separation membrane 4 that only transmits hydrogen atoms, a palladium alloy thin film may particularly preferably be used. Other applicable materials for the hydrogen separation membrane 4 include a zirconium-nickel (Zr—Ni) alloy film, a vanadium-nickel (V—Ni) alloy film, a niobium-nickel (Nb—Ni) alloy film, or a film consisting of an alloy of one or more metals selected from the group consisting of niobium (Nb), nickel (Ni), cobalt (Co), and molybdenum (Mo) with one or more metals selected from the group consisting of vanadium (V), titanium (Ti), zirconium (Zr), tantalum (Ta), and hafnium (Hf).

A preferable arrangement of the plasma reactor 2 and the hydrogen separation membrane 4 is one in which the plasma reactor 2 forms a closable space and the hydrogen separation membrane 4 is housed within the plasma reactor 2 so as to define the hydrogen flow channel 5. In other words, the discharge space 3 is formed between the plasma reactor 2 and the hydrogen separation membrane 4, the discharge space 3 and the hydrogen flow channel 5 are separately defined by the hydrogen separation membrane 4, wherein one surface of the hydrogen separation membrane 4 is exposed to the discharge space 3, and the other surface is exposed to the hydrogen flow channel 5.

The electrode 7 is preferably disposed in a position facing the hydrogen separation membrane 4 with the plasma reactor 2 interposed therebetween. As shown in FIG. 2, when the hydrogen separation membrane 4 is connected to a high-voltage power supply 8, the hydrogen separation membrane 4 functions as a high-voltage electrode and the electrode 7 is grounded and functions as a ground electrode. When the electrode 7 is connected to the high-voltage power supply 8, the electrode 7 functions as the high-voltage electrode and the hydrogen separation membrane 4 is grounded and functions as the ground electrode. The high-voltage power supply 8 preferably applies a bipolar pulse waveform to the high-voltage electrode.

The starting gas source 9 supplies a starting gas containing hydrogen molecules and/or hydrides to the discharge space 3. The starting gas source 9 may be a storage vessel for starting gas such as a tank, a pipeline or gas delivery equipment, or a production device that generates starting gas by a chemical reaction. The starting gas supplied by the starting gas source 9 may be, for example, a gas mixture of hydrogen and another gas, ammonia, urea, a hydrocarbon gas such as methane, or a gas mixture of ammonia and an inert gas. It may also be pure ammonia generated from liquid ammonia or urea or a gas mixture of the ammonia and an inert gas. Further, it is possible to use a gas mixture of ammonia, hydrogen, and nitrogen generated by decomposing part of the ammonia with a catalyst. The starting gas source 9 can regulate the pressure of the starting gas to be supplied.

The starting gas source 9 and the discharge space 3 are connected by a starting gas flow channel 11. A valve 13 for controlling the flow rate of the starting gas may be provided on the path from the starting gas source 9 to the discharge space 3. The starting gas supplied from the starting gas source 9 to the starting gas flow channel 11 at a predetermined pressure is supplied to the discharge space 3 with its flow rate regulated by the valve 13.

Zeolite and/or activated alumina may be used as the adsorbent 6 to be filled in the discharge space 3. When a gas containing hydrogen molecules or ammonia as its main component is used as the starting gas, it is preferable to use zeolite with a pore size of 0.2 to 0.8 nanometers (2 to 8 angstrom). Further, when a gas containing a hydrocarbon gas as its main component is used as the starting gas, it is preferable to use zeolite with a pore size of 0.5 to 1.0 nanometers (5 to 10 angstrom).

The hydrogen that is highly purified by being generated in the discharge space 3 and transmitted through the hydrogen separation membrane 4 is introduced into the hydrogen flow channel, and further into the hydrogen tank 16. In order to introduce the purified hydrogen into the hydrogen flow channel 5, a vacuum pump 14 is provided to the hydrogen flow channel 5. The pressure in the hydrogen flow channel 5 can be controlled by the vacuum pump 14.

The exhaust gas emitted from the discharge space 3 is introduced into an exhaust gas treatment device 18 via an exhaust gas flow channel 12. The exhaust gas treatment device 18 constantly monitors the gas concentration at the exit of the discharge space 3 for hydrogen gas concentration and starting gas concentration and, depending on the components of the exhaust gas, performs one of the processes of storing the gas, reacting the gas, or reusing it as starting gas or releasing it.

In order to further improve the purification rate of the hydrogen, it is possible to provide a means for pressurizing the discharge space 3. Here, pressurizing the discharge space 3 means maintaining the discharge space 3 at a pressure higher than atmospheric pressure. Conventionally, it was considered preferable to maintain a low pressure in order to transform a starting gas into plasma by an electric discharge. However, it has been confirmed that by pressurizing the discharge space 3 with the starting gas in a state of being adsorbed by the adsorbent 6, it is possible to purify hydrogen gas at a higher yield.

The means for pressurizing the discharge space 3 in the present embodiment are the valve 13 provided to the starting gas flow channel 11, and a valve 19 additionally provided to the exhaust gas flow channel 12. By controlling the degree of opening of the valve 13 to regulate the supply rate of the starting gas at the same time as controlling the degree of opening of the valve 19 to regulate the flow rate of the exhaust gas, the discharge space 3 can be maintained at a higher pressure than atmospheric pressure.

A method for purifying hydrogen using the hydrogen purification device 1 will now be described. The starting gas supplied from the starting gas source 9 to the discharge space 3 is adsorbed by the adsorbent 6 and remains in the discharge space 3. When the starting gas adsorbed by the adsorbent 6 is transformed into plasma by the electric discharge between the electrode 7 and the hydrogen separation membrane 4, the components of the starting gas desorb from the adsorbent. The hydrogen atoms generated by the transformation of the starting gas into plasma are adsorbed by the hydrogen separation membrane 4 because pressure in the hydrogen flow channel 5 is reduced, and scatter as they permeate the hydrogen separation membrane 4 until they reach the hydrogen flow channel 5, where they recombine into hydrogen molecules. From the hydrogen flow channel 5 they are further introduced into the hydrogen tank 16. In the discharge space 3 nearly all the starting gas is decomposed by the electric discharge, and only hydrogen is introduced into the hydrogen flow channel 5 while the components of the starting gas other than hydrogen are emitted by the exhaust gas treatment device 18.

The hydrogen purification device 1 according to the present invention includes a control unit 15. The control unit 15 is interconnected with the other components of the hydrogen purification device 1 via control lines 21, 22, 23, 24, 25, 26, and 27, and gathers data regarding the hydrogen purification to control the operating conditions. The control unit 15 performs the following control:

Monitors and controls the flow rate of the starting gas supplied from the starting gas source 9.

Controls the pressure in the discharge space 3 by operating the degree of opening of the valves 19.

Controls the voltage applied by the high-voltage power supply 8.

Maintains reduced pressure in the hydrogen flow channel 5 by controlling the pressure of the vacuum pump 14.

Monitors the components of the exhaust gas introduced into the exhaust gas treatment device and performs feedback control based on the components of the exhaust gas.

Monitors the remaining amount of hydrogen in the hydrogen tank 16.

In particular, the control unit 15 monitors the concentration of the starting gas at the exit of the discharge space 3 and constantly compares it to a reference value stored in advance. If the measured value of concentration of starting gas contained in the exhaust gas is higher than the reference value, the control unit 15 performs at least one of the following control operations:

Issues a command to the starting gas source 9 to reduce the supply rate of starting gas.

Issues a command to the vacuum pump 14 to further reduce pressure in the hydrogen flow channel 5.

Raises the voltage of the high-voltage power supply to raise the voltage applied to the discharge space 3.

EXAMPLES

Example 1

A preferable example of the hydrogen purification device according to the present invention is described below with reference to FIG. 2 and FIG. 3. FIG. 2 is a vertical cross-sectional view of the plasma reactor 2 according to an example of the present invention. The plasma reactor 2 is made of quartz glass in the form of a cylindrical dielectric body, in which the hydrogen separation membrane 4 in the form of a cylindrical palladium alloy thin film is housed. The hydrogen separation membrane 4 according to this example is disposed concentrically with the plasma reactor 2 in a state of being supported by supports 17, and between the inner surface of the plasma reactor 2 and the outer surface of the hydrogen separation membrane 4, the discharge space 3 is defined. The discharge space 3 is in communication with the starting gas flow channel 11, and is supplied with starting gas from the starting gas source 9. The cylindrical space on the inside of the hydrogen separation membrane 4 forms the hydrogen flow channel 5, which is in communication with the hydrogen tank 16.

The discharge space 3 is filled with the adsorbent 6. In this example, hydrophobic zeolite (HSZ® molded article, HSL-900, made by Tosoh Corporation) in pellet form with an average pore size of 0.65 nanometers was used as the adsorbent 6.

The ground electrode 7 is disposed in contact with the outside of the plasma reactor 2. In this example, the hydrogen separation membrane 4 is connected to the high-voltage power supply 8, such that the hydrogen separation membrane 4 functions as a high-voltage electrode. The high-voltage power supply 8 generates a bipolar pulse waveform with an extremely short retention time of 10 microseconds to supply electric power with a high electronic energy density to the hydrogen separation membrane 4. When a high voltage is applied to the hydrogen separation membrane 4, a dielectric barrier discharge occurs in the discharge space 3 between the inner surface of the plasma reactor 2 and the hydrogen separation membrane 4.

In this example, hydrogen gas with a purity of 99.9% is used as the starting gas. The hydrogen molecules in the starting gas supplied from the starting gas source 9 are adsorbed by the adsorbent 6 and remain in the discharge space 3. By controlling the degree of opening of valve 13 and valve 19, the pressure in the discharge space 3 is maintained at a gauge pressure of 100 kPa.

The hydrogen molecules are decomposed into hydrogen atoms by the electric discharge, are adsorbed onto the surface of the hydrogen separation membrane 4, permeate the hydrogen separation membrane 4 and are introduced into the hydrogen tank 16 via the hydrogen flow channel 5. In order to make the hydrogen atoms adsorb onto and permeate the hydrogen separation membrane 4, the vacuum pump 14 reduces the pressure in the hydrogen flow channel 5. In this example, the pressure in the hydrogen flow channel 5 is reduced to a gauge pressure of −50 kPa to −90 kPa.

Table 1 below shows the results of using the hydrogen purification device 1 according to this example to purify hydrogen from a starting gas containing hydrogen molecules. The supply rate of the starting gas, which was a hydrogen gas with a purity of 99.9%, was varied from 1.0 L/min to 5.0 L/min. The flow rate of the hydrogen gas that permeated the hydrogen separation membrane 4 and was introduced into the hydrogen tank 16 was measured for each supply rate of the starting gas, and the ratio of the amount of hydrogen purified relative to the supply rate (flow rate) of hydrogen contained in the starting gas was calculated as a hydrogen purification rate (%).

TABLE 1

| Hydrogen concentration in the starting gas (%) | Supply rate of starting gas (L/min) | Amount of hydrogen purified (L/min) | Hydrogen purification rate (%) |
| --- | --- | --- | --- |
| 99.9 | 5.00 | 3.72 | 74.5 |
| 99.9 | 3.05 | 3.05 | 100.0 |
| 99.9 | 1.02 | 1.02 | 100.0 |

As a comparative example, a hydrogen purification device 1 with the zeolite adsorbent removed was used to purify hydrogen from the same hydrogen gas with a purity of 99.9% as in Example 1 supplied at the same flow rates as in Example. Like in Example 1, the flow rate of the hydrogen gas that permeated the hydrogen separation membrane 4 and was introduced into the hydrogen tank 16 was measured as the amount of hydrogen purified (L/min). Further, the ratio of the amount of hydrogen purified relative to the supply rate (flow rate) of hydrogen contained in the starting gas was calculated as a hydrogen purification rate (%). The results are shown in Table 2 below.

TABLE 2

| Hydrogen concentration in the starting gas (%) | Supply rate of starting gas (L/min) | Amount of hydrogen purified (L/min) | Hydrogen purification rate (%) |
| --- | --- | --- | --- |
| 99.9 | 5.00 | 0.67 | 13.4 |
| 99.9 | 3.00 | 0.55 | 18.3 |
| 99.9 | 1.00 | 0.51 | 51.0 |

Figure 3:
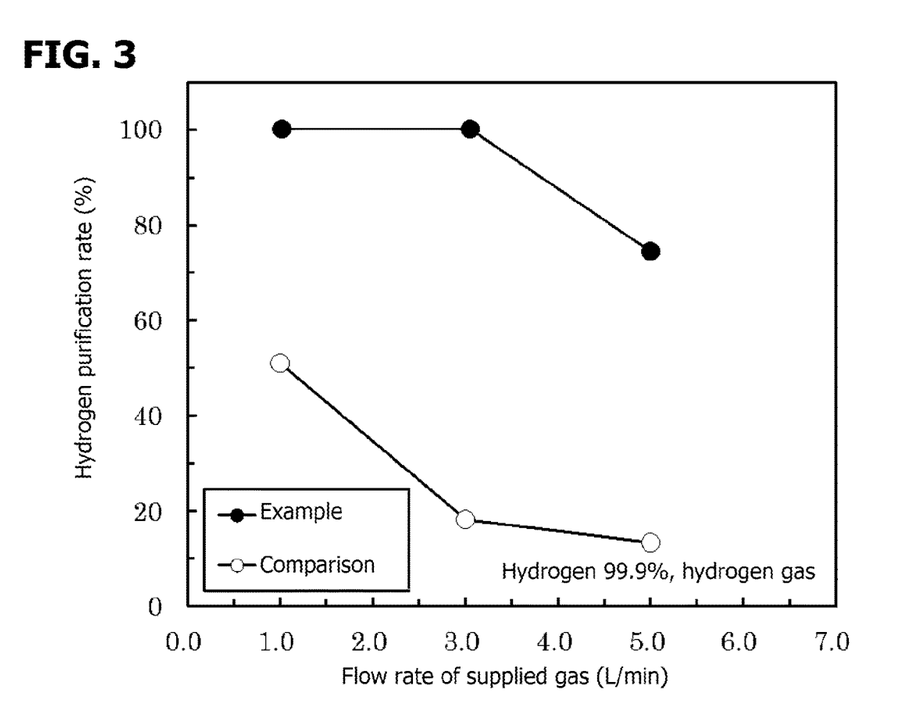
FIG. 3 shows the relationship between the starting gas flow rate and hydrogen purification rate in Example 1.

A graph comparing the hydrogen purification rates of Example 1 and the comparative example is shown in FIG. 3. The horizontal axis of the graph indicates the supply rate of the starting gas as the supplied gas flow rate. Both in Example 1 and in the comparative example, the purity of the hydrogen gas introduced into the hydrogen flow channel 5 was very high; 99.999% or higher, and it has thus been confirmed that this method is an effective method for purifying hydrogen.

On the other hand, as is clear from the result shown in FIG. 3, the hydrogen purification device 1 according to Example 1 could, due to its inclusion of the adsorbent 6 in the discharge space 3, purify hydrogen at a constantly higher yield than the comparative example which lacked the adsorbent 6, even when the supply rate of starting gas was increased. in particular, the device could obtain a high-purity hydrogen gas with a purification rate of approximately 100% up to a starting gas flow rate of 3.0 L/min, and it has thus been confirmed that the device is suited for purification of large amounts of hydrogen.

In addition, in this example the hydrogen contained in the starting gas is purified at a high purification rate and introduced into the hydrogen tank, and therefore only trace amounts of impurities are emitted to the exhaust gas treatment device 18. This renders exhaust gas treatment almost unnecessary.

Example 2

In this example, a gas mixture consisting of 75% hydrogen gas and 25% nitrogen gas was used as the starting gas to purify hydrogen. All other configurations of the hydrogen purification device 1 and conditions of the hydrogen purification process are the same as described above and are omitted here.

Table 3 below shows the amount of hydrogen purified and the hydrogen purification rate when the supply rate of the gas containing 75% hydrogen and 25% nitrogen of this example was varied from about 1.0 L/min to 5.0 L/min.

TABLE 3

| Hydrogen concentration in the starting gas (%) | Supply rate of starting gas (L/min) | Amount of hydrogen purified (L/min) | Hydrogen purification rate (%) |
| --- | --- | --- | --- |
| 75 | 4.95 | 3.32 | 89.4 |
| 75 | 3.00 | 2.25 | 100.0 |
| 75 | 1.00 | 0.75 | 100.0 |

As a comparative example, a hydrogen purification device 1 with the zeolite adsorbent removed was used to purify hydrogen from the same starting gas containing 75% hydrogen and 25% nitrogen as in Example 2. The supply rate of the starting gas was varied from about 1.0 L/min to 5.0 L/min. The amount of hydrogen purified and the hydrogen purification rate of this comparative example are shown in Table 4 below.

TABLE 4

| Hydrogen concentration in the starting gas (%) | Supply rate of starting gas (L/min) | Amount of hydrogen purified (L/min) | Hydrogen purification rate (%) |
|---|---|---|---|
| 75 | 5.00 | 0.6 | 16.0 |
| 75 | 3.00 | 0.49 | 21.8 |
| 75 | 1.00 | 0.45 | 60.0 |

Figure 4:
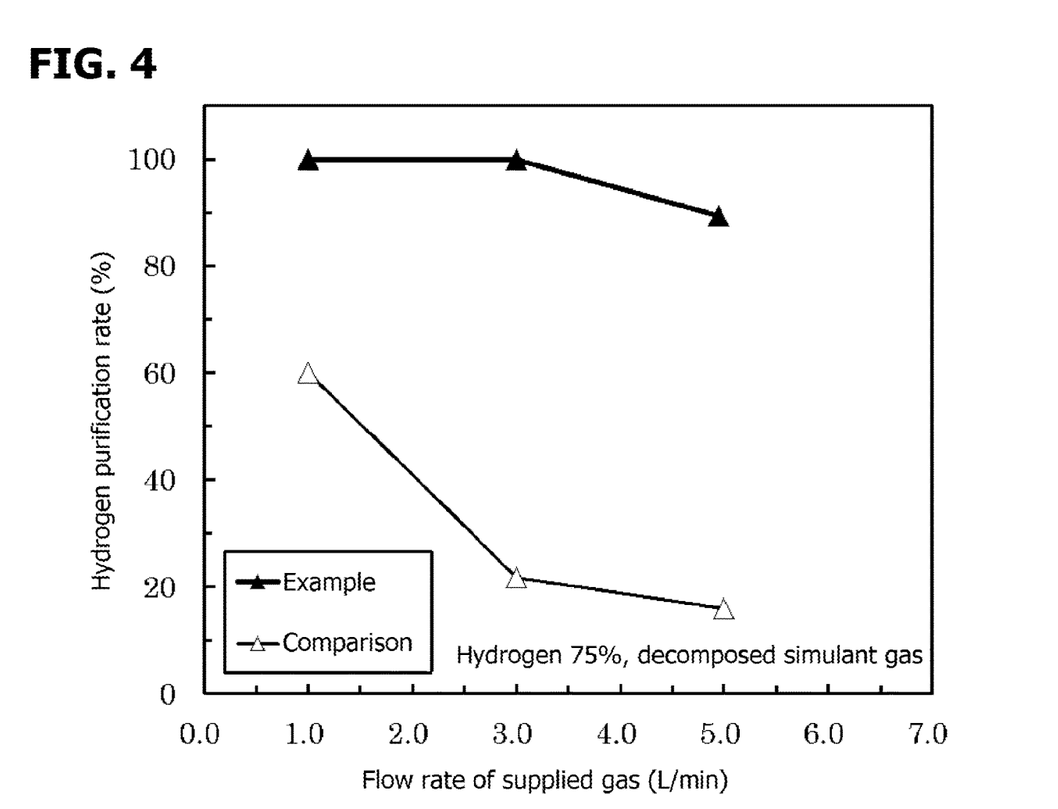
FIG. 4 shows the relationship between the starting gas flow rate and hydrogen purification rate in Example 2.

A graph comparing the hydrogen purification rates of Example 2 and the comparative example is shown in FIG. 4. Both in Example 2 and in the comparative example, the purity of the hydrogen gas introduced into the hydrogen flow channel 5 was very high; 99.999% or higher, and the method was thus an effective method for purifying hydrogen regardless of whether or not an adsorbent was present. On the other hand, as is clear from the result shown in FIG. 4, the hydrogen purification device 1 according to Example 2 could purify hydrogen of a high purity at a constantly high yield approximately proportionally to an increase in the supply rate of the starting gas even when using a gas mixture of hydrogen and nitrogen. In other words, the effect of the adsorbent 6 is confirmed in this example too, and it has thus been confirmed that the configuration of the hydrogen purification device 1 is suited for purification of large amounts of hydrogen.

In addition, in this example the hydrogen contained in the starting gas is purified at a high purification rate and introduced into the hydrogen tank, and therefore almost only nitrogen is emitted to the exhaust gas treatment device 18. Nitrogen can be released into the atmosphere as is, which renders exhaust gas treatment almost unnecessary. Further, since the exhaust gas is nitrogen of a high purity, the device also functions as a device for purifying high-purity nitrogen.

Example 3

In the hydrogen purification device 1 according to this example, an ammonia decomposer using a catalyst was applied to the starting gas source 9. The starting gas source 9 supplied a gas mixture containing about 75% hydrogen, about 25% nitrogen, and 1000 ppm of ammonia to purify hydrogen. All other configurations of the hydrogen purification device 1 and conditions of the hydrogen purification process are the same as described above and are omitted here.

Table 5 below shows the amount of hydrogen purified and the hydrogen purification rate when the supply rate of the ammonia-decomposed gas of this example was varied from about 1.0 L/min to 5.0 L/min.

TABLE 5

| Hydrogen concentration in the starting gas (%) | Supply rate of starting gas (L/min) | Amount of hydrogen purified (L/min) | Hydrogen purification rate (%) |
|---|---|---|---|
| 75 | 5.00 | 2.99 | 79.7 |
| 75 | 3.00 | 2.03 | 90.1 |
| 75 | 1.00 | 0.68 | 90.1 |

As a comparative example, a hydrogen purification device 1 with the zeolite adsorbent removed was used to purify hydrogen from the same ammonia-decomposed gas as the starting gas of Example 3. Like in Example 3, the supply rate of the starting gas was varied from about 1.0 L/min to 5.0 L/min. The amount of hydrogen purified and the hydrogen purification rate of this comparative example are shown in Table 6 below.

TABLE 6

| Hydrogen concentration in the starting gas (%) | Supply rate of starting gas (L/min) | Amount of hydrogen purified (L/min) | Hydrogen purification rate (%) |
|---|---|---|---|
| 75 | 5.00 | 0.30 | 8.0 |
| 75 | 3.14 | 0.65 | 27.6 |
| 75 | 1.12 | 0.77 | 91.7 |

Figure 5:
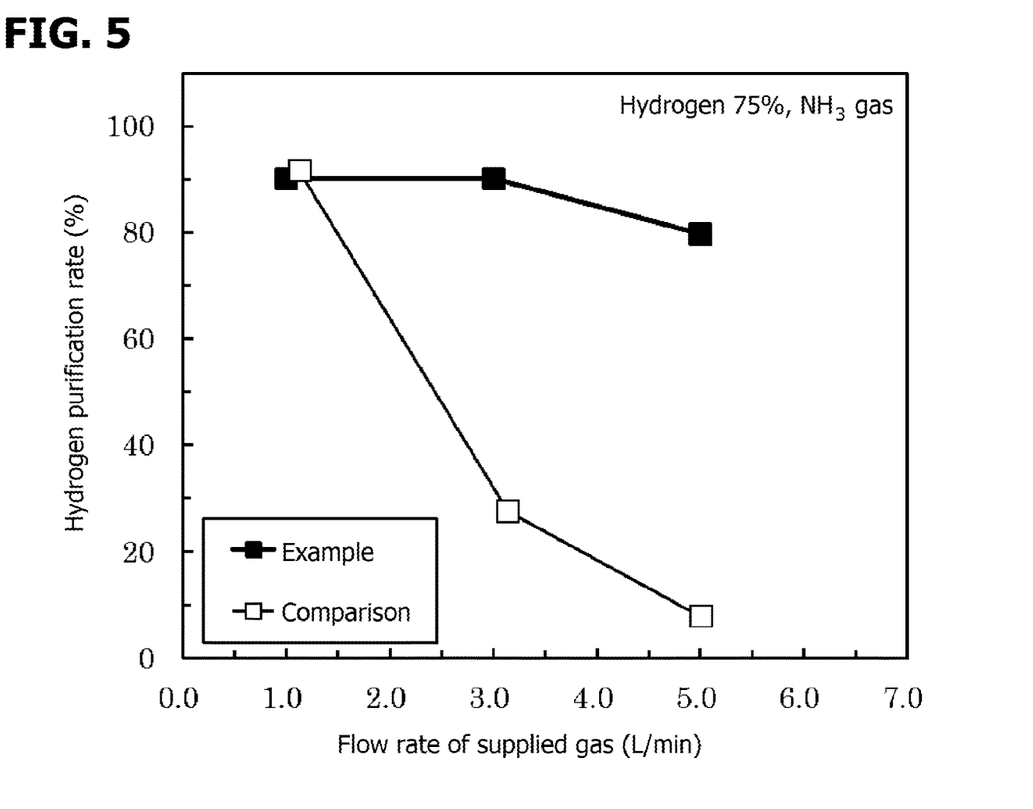
FIG. 5 shows the relationship between the starting gas flow rate and hydrogen purification rate in Example 3.

A graph comparing the hydrogen purification rates of Example 3 and the comparative example is shown in FIG. 5. Both in Example 3 and in the comparative example, the purity of the hydrogen gas introduced into the hydrogen flow channel 5 was very high; 99.999% or higher, like in Example 1, and the method was thus an effective method for purifying hydrogen regardless of whether or not an adsorbent was present.

In this example, the hydrogen purification rate of the hydrogen purification device 1 changed from 90% to 79% as the supply rate of starting gas increased. It was considered that the presence of ammonia might be affecting the purification rate. However, compared to a case where the adsorbent was absent, the amount of hydrogen purified and the purification rate for high flow rates were extremely high, and it has thus been confirmed that the configuration of the hydrogen purification device 1 is suited for purification of large amounts of hydrogen even when using an ammonia-decomposed gas.

Example 4

In this example, a hydrogen gas with a purity of 99.9% was used as the starting gas. In addition, the pressure in the discharge space 3 was maintained at a state of being pressurized to a gauge pressure of 200 kPa through control of the degree of opening of valve 13 and valve 19. All other configurations of the hydrogen purification device 1 and conditions of the hydrogen purification process are the same as described above and are omitted here.

Table 7 below shows the amount of hydrogen purified and the hydrogen purification rate when the supply rate of the hydrogen gas of this example was varied from about 1.0 L/min to 7.0 L/min.

TABLE 7

| Hydrogen concentration in the starting gas (%) | Supply rate of starting gas (L/min) | Amount of hydrogen purified (L/min) | Hydrogen purification rate (%) |
|---|---|---|---|
| 99.9 | 7.00 | 6.43 | 91.9 |
| 99.9 | 6.00 | 5.99 | 99.9 |
| 99.9 | 5.00 | 5.00 | 100.0 |
| 99.9 | 3.00 | 3.00 | 100.0 |
| 99.9 | 1.00 | 1.00 | 100.0 |

As a comparative example, a hydrogen purification device 1 with the zeolite adsorbent removed was used to purify hydrogen from the same hydrogen gas as the starting gas of Example 4. The supply rate of the starting gas was varied from about 1.0 L/min to 5.0 L/min. The amount of hydrogen purified and the hydrogen purification rate of this comparative example are shown in Table 8 below. When starting gas in a pressurized state was supplied to the hydrogen purification device 1 without an adsorbent, the starting gas did not transform into plasma and no hydrogen atoms were obtained from the starting gas. Therefore, in the comparative example, no hydrogen was introduced into the hydrogen flow channel, and it was not possible to purify hydrogen.

TABLE 8

| Hydrogen concentration in the starting gas (%) | Supply rate of starting gas (L/min) | Amount of hydrogen purified (L/min) | Hydrogen purification rate (%) |
|---|---|---|---|
| 99.9 | 5.00 | 0.00 | 0.00 |
| 99.9 | 3.00 | 0.00 | 0.00 |
| 99.9 | 1.00 | 0.00 | 0.00 |

Figure 6:
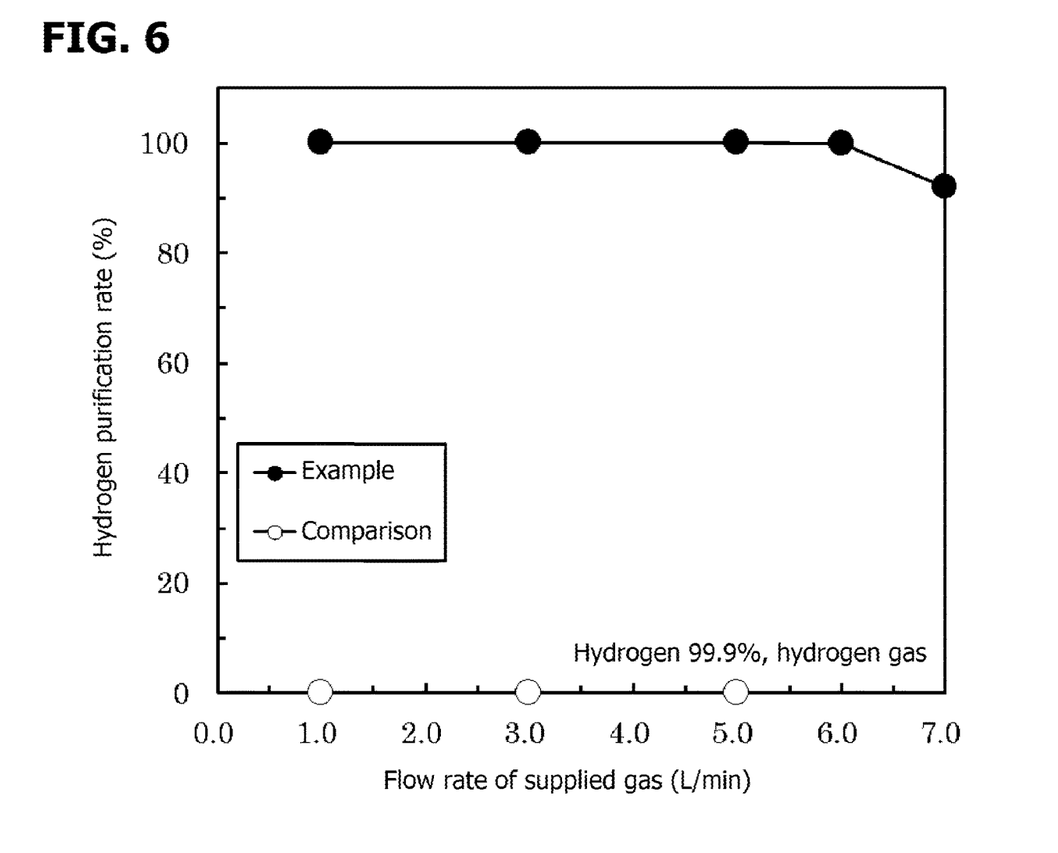
FIG. 6 shows the relationship between the starting gas flow rate and hydrogen purification rate in Example 4.

A graph comparing the hydrogen purification rates of Example 4 and the comparative example is shown in FIG. 6. In Example 4, the hydrogen purification rate was 91% or higher even when the flow rate of the starting gas was increased up to 7.0 L/min, and it was thus confirmed that hydrogen could be purified extremely efficiently. It has thus been confirmed that maintaining the discharge space in a pressurized state is preferable for the hydrogen purification device and hydrogen purification method according to the present invention.

The configuration of the hydrogen purification device 1 described in the above Examples may be changed as appropriate. The adsorbent 6 may be in pellet form, powder form, or any other form that can fill the discharge space 3 and may be selected depending on the type of starting gas. As a variant of the plasma reactor 2, it is possible to apply a box-shaped or plate-shaped dielectric body having a discharge space 3 formed therein. In this case, the hydrogen separation membrane 4 covers the discharge space 3, and the hydrogen flow channel 5 can be provided over the hydrogen separation membrane 4 as a separate vessel.

DESCRIPTION OF THE REFERENCE NUMERAL

1 Hydrogen purification device
2 Plasma reactor
3 Discharge space
4 Hydrogen separation membrane
5 Hydrogen flow channel
6 Adsorbent
7 Electrode
8 High-voltage power supply
9 Starting gas source
11 Starting gas flow channel
12 Exhaust gas flow channel
13, 19 Valve
14 Vacuum pump
15 Control unit
16 Hydrogen tank
17 Support
18 Exhaust gas treatment device
21, 22, 23, 24, 25, 26, 27 Control lines

The invention claimed is:

1. A hydrogen purification device comprising:
a starting gas source configured to supply a starting gas containing hydrogen molecules and/or hydrides to a discharge space;
a plasma reactor that defines at least a part of the discharge space;
a hydrogen flow channel that is connected to the discharge space and leads out purified hydrogen from the starting gas source;
a hydrogen separation membrane that allows only hydrogen atoms to pass therethrough, partitions the discharge space from the hydrogen flow channel, defines at least a part of the discharge space by one surface thereof, and defines at least a part of the hydrogen flow channel by the other surface thereof;
an electrode that is disposed outside the discharge space;
an adsorbent that is filled in the discharge space and configured to adsorb starting gas; and
an exhaust gas flow channel that is connected to the discharge space to lead out an exhaust gas from the discharge space.

2. The hydrogen purification device according to claim 1, wherein the adsorbent comprises zeolite and/or activated alumina.

3. The hydrogen purification device according to claim 1, wherein the starting gas source is a vessel that supplies a gas containing hydrogen molecules, and the adsorbent is a hydrogen adsorbent that adsorbs hydrogen molecules.

4. The hydrogen purification device according to claim 1, wherein the starting gas source is a vessel that supplies a gas containing ammonia, and the adsorbent is an ammonia adsorbent that adsorbs ammonia.

5. The hydrogen purification device according to claim 1, further comprising a pressurizing means configured to pressurize the discharge space.

6. The hydrogen purification device according to claim 5 wherein the means for pressurizing means are;
a valve provided to the starting gas flow channel that is connected to the starting gas source and the discharge space, and
a valve provided to the exhaust gas flow channel.

7. A method for purifying hydrogen by a hydrogen purification device comprising a discharge space, at least a part of a wall section of which is defined by a plasma reactor and a hydrogen separation membrane, an adsorbent contained in the discharge space, and a hydrogen flow channel partitioned from the plasma reactor by the hydrogen separation membrane, the method comprising the steps of:
supplying a starting gas containing hydrogen molecules and/or hydrides to the discharge space;
adsorbing the hydrogen molecules and/or hydrides by the adsorbent;
causing an electric discharge in the discharge space to desorb material adsorbed by the adsorbent in the form of atoms;
reducing pressure in the hydrogen flow channel to cause the hydrogen atoms in the discharge space to permeate the hydrogen separation membrane; and
introducing hydrogen atoms that have permeated the hydrogen separation membrane into the hydrogen flow channel as hydrogen molecules.

8. The hydrogen purification method according to claim 7, further comprising the steps of:
measuring starting gas concentration at an exit of the discharge space;

comparing a measured value of starting gas concentration with a reference value;

when the measured value of starting gas concentration is higher than the reference value, performing one or a plurality of control operations selected from reducing a supply rate of the starting gas, further reducing pressure in the hydrogen flow channel, and raising a discharge voltage in the discharge space.

9. The hydrogen purification method according to claim 7, further comprising a step of pressurizing the discharge space.

* * * * *

UNITED STATES PATENT AND TRADEMARK OFFICE
CERTIFICATE OF CORRECTION

| | |
|---|---|
| PATENT NO. | : 11,472,701 B2 |
| APPLICATION NO. | : 16/971251 |
| DATED | : October 18, 2022 |
| INVENTOR(S) | : Shinji Kambara, Tomonori Miura and Yukio Hayakawa |

It is certified that error appears in the above-identified patent and that said Letters Patent is hereby corrected as shown below:

In the Specification

Column 2, Line 5 – Replace "SP2014-70012" with --JP2014-70012--

Column 2, Line 6 – Replace "WH11-319486" with --JPH11-319486--

Signed and Sealed this
Seventh Day of February, 2023

*Katherine Kelly Vidal*

Katherine Kelly Vidal
*Director of the United States Patent and Trademark Office*